Dec. 8, 1931.  O. W. HEISE  1,835,044
GAUGE ADJUSTING MEANS
Filed June 25, 1929  2 Sheets-Sheet 1

Inventor
Otto W. Heise
by Roberts Cushman Woodberry
his Attorneys.

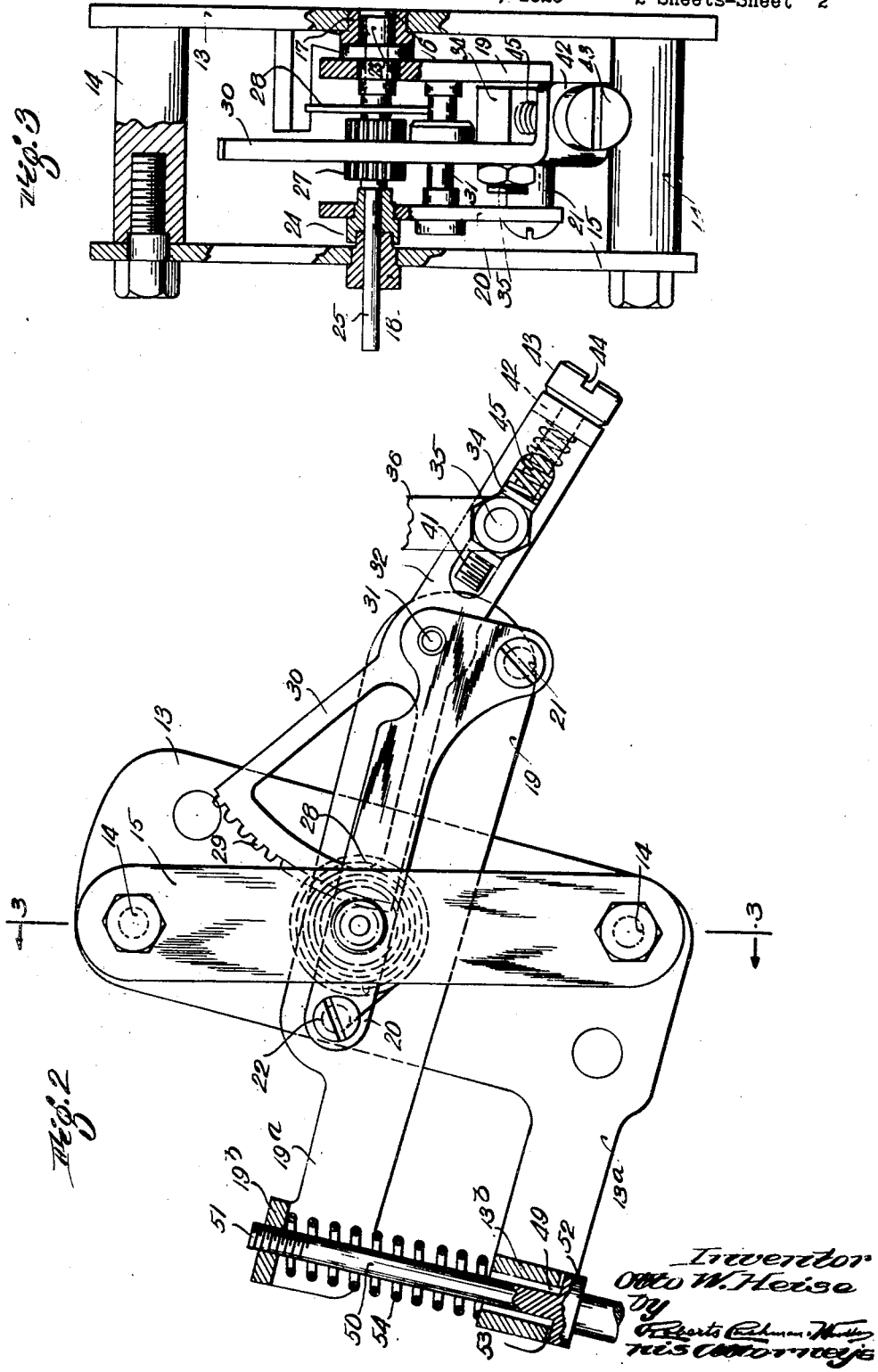

Patented Dec. 8, 1931

1,835,044

UNITED STATES PATENT OFFICE

OTTO W. HEISE, OF BRIDGEPORT, CONNECTICUT, ASSIGNOR TO CONSOLIDATED ASHCROFT HANCOCK COMPANY, OF NEW YORK, N. Y., A CORPORATION OF DELAWARE

GAUGE ADJUSTING MEANS

Application filed June 25, 1929. Serial No. 373,584.

This invention pertains to pressure gauges and relates more particularly to means for adjusting such gauges. All gauges which are in constant use, particularly if exposed to vibration, as for example when used upon a locomotive, or if subject to sudden shocks or blows, (as when applied to certain types of portable apparatus) tend to get out of adjustment very quickly by reason of wear of the moving parts or gradual shifting of relatively adjustable parts which individually or collectively affect the action of the gauge movement so that the index needle no longer indicates the true pressure.

The necessity for frequent adjustment of pressure gauges has been recognized by various agencies interested in the safety of life and property, and regulations have consequently been made requiring periodical adjustment of gauges. Thus for example the Interstate Commerce Commission requires that steam gauges of locomotives must be removed at least once in three months for test and adjustment.

The adjustment just referred to is to be distinguished from the relatively infrequent recalibration of the gauge necessitated by slow and permanent changes in the characteristics of the pressure responsive element, such for example as a change in its temper or resiliency from exposure to excessive temperature, or to variations in its wall thickness due to erosion. Calibration to compensate for such changes in the pressure responsive element commonly necessitates a variation in the ratio of movement between the pressure responsive element and the mechanical portions of the gauge mechanism, and a desirable calibrating means is disclosed for example in the copending application of H. A. L. Carlton, Serial No. 213,754, filed August 18, 1927, and is herein illustrated as adjunctive to the adjusting means forming the subject matter of the present invention. As distinguished from this recalibrating means, the adjustment of the gauge parts to compensate for wear and the like is usually accomplished by removing the index needle from its staff and replacing it at the proper position while the gauge is under standard pressure.

While apparatus for applying standard test pressure to a gauge is relatively simple and commonly available, it is not always easy to find men skilled in such matters to do the actual adjusting. A pressure gauge is a delicate piece of mechanism akin to a clock in its mechanical make-up and attempts by unskilled persons to adjust the gauge often result in serious injury to the gauge mechanism. For example, attempts to remove the index needle from its staff and to replace it in position without the provision of proper tools and without experience in such matters, while seemingly simple and easy to accomplish, very frequently results in the bending of some of the delicate parts of the gauge, such as the pinion or index staff, and many gauges have been ruined in this way. Moreover, this mode of adjustment, even in skilled hands, necessitates the removal of the gauge glass and retaining ring or bezel, which takes time, exposes the gauge movement to dust and dirt, and frequently through carelessness, results in breakage of the gauge glass.

In accordance with the present invention, I have provided simple, reliable and inexpensive means permitting adjustment of the gauge by any one having the most rudimentary experience in the use of tools and without substantial danger of damage to the gauge or necessitating removal of the glass or retaining ring. To this end I provide means for adjusting the position of the index relatively to the pressure responsive device (for example the Bourdon tube) and so arrange the adjusting means that it is accessible through a small opening, preferably normally closed, in the wall of the gauge casing.

In the accompanying drawings,

Fig. 2 is a plan view to larger scale showing the gauge movement removed from the casing and illustrating details of the adjusting means, certain parts being in section; and Fig. 3 is a side elevation of the parts shown in Fig. 2, partly in section on the line 3—3 of Fig. 2.

Figure 1:
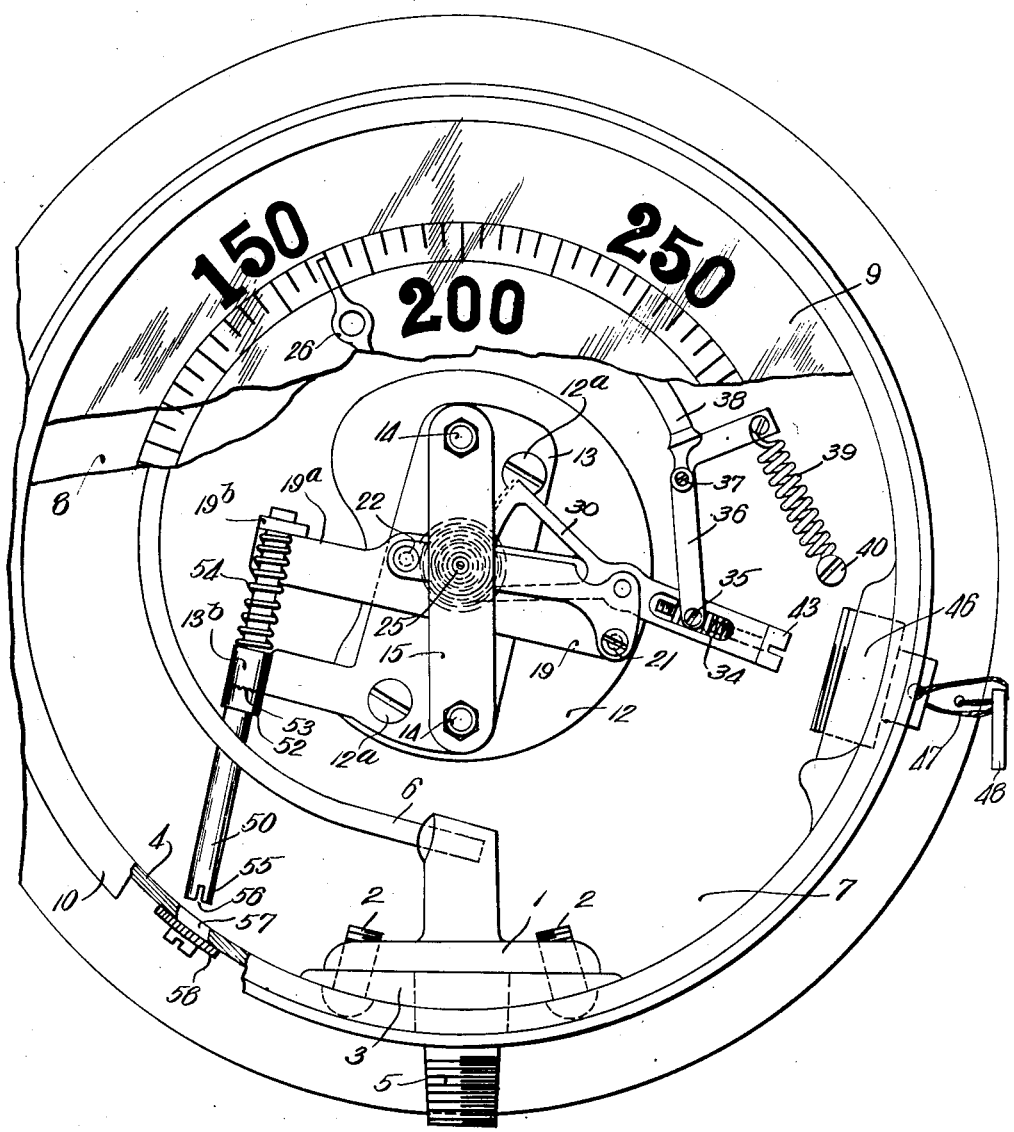
Fig. 1 is a front elevation, more or less diagrammatic in character, showing a Bourdon tube gauge, with portions of the glass and dial broken away and parts of the case in section, embodying the adjusting means of the present invention.

Referring to the drawings, the numeral 1 designates a base member of usual type secured by means of screws 2 to a boss 3 on the inner surface of the cylindrical wall 4 of the gauge casing. The support 1 is provided with the screw-threaded nipple 5 projecting outwardly through an opening in the wall of the casing and adapted for attachment to a pressure supply pipe. The base 1 has an internal passage or chamber, as is usual, communicating with the interior of the pressure responsive element 6 mounted upon the inner end of the base. As here shown this pressure responsive element is a Bourdon tube curved to a more or less circular arc. The gauge casing comprises a rear wall 7 integral, if desired, with the cylindrical side wall 4, and the casing is furnished with the usual graduated dial 8 and the glass cover plate 9 held in position by the retaining ring 10. Preferably the rear wall 7 of the casing is furnished with a thickened portion 12 at its center, such thickened portion being provided with screw-threaded openings for the reception of screws 12ª holding the rear member 13 of the movement supporting frame in position. The member 13 is provided with forwardly extending shouldered posts 14 (Fig. 3) which support the front member or bridge piece 15 of the frame. The rear member 13 is furnished with an opening 16 for the reception of a bearing bushing 17, and the front member 15 is furnished with an opening axially aligned with the opening 16 and adapted to receive a bushing 18.

The gauge movement proper is carried by a pivoted support comprising the rear member 19 and the front member 20 held in fixed spaced relation by means of shouldered posts 21 and 22 (Fig. 2). The rear member 19 of this support is furnished with a trunnion 23 which turns freely within the bushing 17 while the forward member 20 is furnished with a trunnion 24 having a bearing socket which receives the inner end of the bushing 18.

The trunnions 23 and 24 are provided with axially aligned bearing openings for the reception of the index staff 25 which projects forwardly through the dial 8 and is adapted to carry the index or needle 26 (Fig. 1). The index staff is also provided with the usual pinion 27 (Fig. 3) and hair spring 28, and the pinion meshes with teeth 29 on a segment lever 30 carried by a staff 31 journaled in the members 19 and 20. The lever 30 is provided with an arm 32 which, as here shown, is furnished with an elongate slot for the reception of a sliding block 34. This block carries a pivot pin 35 to which one end of a link 36 is attached. The other end of the link is pivotally secured at 37 (Fig. 1) to the free end 38 of the Bourdon tube. If desired, a spring 39 may be connected at one end to the tube 38 or to a bracket carried thereby, and at its other end to a fixed anchorage 40, such spring in well known manner adding its resistance to that of the tube, thus adapting the tube for use with high pressures.

The block 34 is preferably provided with an internally screw-threaded opening for the reception of an adjusting screw 41. This screw passes through an opening in a bracket 42 which may be an integral bent portion of the arm 32, and the screw is provided with an enlarged head 43 preferably having a slot 44 for the reception of a screw driver. A spring 45 surrounds the screw 41, intermediate the block 34 and the bracket 42, and by compressive stress tends to hold the head 43 in firm frictional engagement with the outer surface of the bracket 42. If desired, the opposed surfaces of the head 43 and the bracket may be roughened to increase the frictional resistance to turning. By applying sufficient force the screw 43 may be rotated and thus the block 35 adjusted, thereby varying the leverage ratio between the Bourdon tube and the gauge movement. Preferably the wall of the casing is furnished with an opening opposite to the screw head 43, such opening being normally closed by a plug 46 (Fig. 1) which, if desired, may have an opening for the reception of a cord or wire 47 which receives a seal 48 to prevent removal of the plug by unauthorized persons. The specific means for calibrating the gauge as just outlined is more fully described in the copending application of Carlton Serial No. 213,754, above referred to, and, except in combination with other features, is not claimed herein.

The rear member 19 of the swinging support is furnished with a tail piece 19ª provided with a forwardly projecting bracket portion 19ᵇ having an internally screw-threaded opening. The fixed rear frame member 13 is provided with a tail piece 13ª having a forwardly projecting boss 13ᵇ which is furnished with a cylindrical bore 49 through which an adjusting rod or screw 50 passes freely. The inner end of this rod 50 is screw-threaded for engagement with the opening in the bracket 19ᵇ. The rod is also furnished with a flange or collar 52 providing a shoulder adapted to engage the end surface of the boss 13ᵇ. Preferably the opposed faces of this shoulder and the boss are corrugated or toothed, as indicated at 53 (Figs. 1 and 2). A spring 54 interposed between the bracket 19ᵇ, and the end of the boss 13ᵇ tends to swing the arm 19ª in a clockwise direction as viewed in Figs. 1 and 2, thus tending to hold the shoulder of the collar 52 in firm engagement with the boss 13ᵇ. The rod 50 extends to a point adjacent to the inner surface of the wall 4 of the casing as shown at 55 and is preferably provided with a slot 56 for the reception of a screw driver. The casing is furnished with an opening 57 directly opposite the end of the rod 50 through which a screw driver may be passed for engagement with the slot 56. If desired, a removable cover plate 58 may be provided for normally closing the opening 57 to prevent the entrance of dust.

It being assumed that the gauge has been properly calibrated in accordance with the characteristics of the Bourdon tube by adjustment of the block 34, and that the gauge mechanism has been enclosed within the casing and the glass cover plate 9 has been put in position, the index needle being upon its staff 25, the initial adjustment of the index in accordance with a standard pressure may be accomplished by mounting the nipple 5 upon testing apparatus of usual type and subjecting the tube 6 to the desired test pressure. The cover 58 being removed, a screw driver is inserted through the opening 57 to engage the slot 56 and by turning the adjusting screw or rod 50 the arm 19ᵃ may be swung and with it the pivoted gauge movement support. As the entire movement swings about the axis of the index staff 25 and as the position of the block 34 is substantially fixed by reason of its connection to the end of the Bourdon tube, this swinging of the entire gauge movement causes the index needle to travel over the dial and the adjustment is thus continued until the index indicates the test pressure. When once adjusted the pivoted support remains in adjusted position by reason of the resilient pressure between the teeth at 53, considerable force being required to turn the rod 50 in order that these teeth may slip by each other.

As thus arranged, it is evident that the needle 26 may be adjusted relatively to the dial without removing the front plate of the gauge and without disturbing the leverage ratio between the Bourdon tube and the gauge mechanism. The needle remains upon its staff so that there is no danger of bending the parts by removing or replacing the needle and the entire operation may be performed by one relatively unskilled in the art of manipulating delicate parts or mechanisms.

I claim:

1. A pressure gauge of the kind having an outer casing provided with a dial and cover glass, a pressure responsive element within the casing, a gauge movement within the casing, said movement comprising an index staff projecting through an opening in the dial, a segment lever and means connecting the segment lever to the pressure responsive element, said gauge comprising a frame fixed within the casing, a support for the gauge movement pivotally mounted in the frame, a fixed bracket within the casing, said bracket having an opening therethrough, a screw passing freely through said opening and having a shoulder engaging the bracket, the screw having threaded engagement with the support, and a spring tending to keep the shoulder in contact with the bracket, the shoulder and the opposed surface of the bracket having clutch faces, the casing having an opening opposite to the end of the screw to give access to the latter for turning it.

2. A pressure gauge of the kind having an outer casing provided with a dial and cover glass, a pressure responsive element within the casing, a gauge movement within the casing, said movement comprising an index staff projecting through an opening in the dial, a segment lever and means connecting the segment lever to the pressure responsive element, said gauge comprising a frame fixed within the casing, a support for the gauge movement provided with spaced trunnion bearings, said bearings being concentric with the axis of the index staff, an adjusting screw for swinging the support upon its trunnions, the casing having an opening in its wall giving access to said screw for adjusting the latter, and means normally closing the opening.

Signed by me at Bridgeport, Connecticut, this 20th day of June, 1929.

OTTO W. HEISE.